3,775,469
PREPARATION OF UNSATURATED ESTERS
Herbert A. Jung, Brussels, Belgium, assignor to Esso Research and Engineering Company
No Drawing. Filed June 14, 1972, Ser. No. 262,532
Int. Cl. C07c 67/04
U.S. Cl. 260—497 A                                17 Claims

ABSTRACT OF THE DISCLOSURE

Unsaturated esters are prepared through the reaction of a $C_4$–$C_6$ aliphatic conjugated diolefin with a carboxylic acid in the presence of a palladium catalyst and a ligand modifier comprising organic phosphine or phosphite materials and a promoter compound such as sodium borohydride or acetic anhydride. The reaction is carried out in the absence of tertiary amines and in the substantial absence of oxygen. The unsaturated esters produced are useful intermediates which can be hydrogenated and then hydrolyzed to yield plasticizer alcohols.

BACKGROUND OF THE INVENTION

Field of the invention

This invention relates to a process for the formation of unsaturated esters. More particularly, the invention relates to an improved method for securing unsaturated esters through the liquid phase reaction of aliphatic conjugated diolefins with carboxylic acids in the presence of a palladium catalyst and organic phosphine or phosphite ligand modifiers. Selectivities and rates to the terminal carboxylic acid ester are greatly improved if the reaction is run in the presence of promoters such as sodium borohydride, or acetic anhydride.

Description of the prior art

Methods are available in the art for the dimerization of conjugated dienes under various conditions. For example, in U.S. Pat. 3,407,224, such a method is described employing the use of palladium chloride, together with sodium phenoxide in the absence of any additional coordinating ligands. Other workers used only palladium acetate as the catalyst without any coordinating ligand to obtain similar results (see, U.S. Pat. 3,530,187).

In U.S. Pat. 3,541,177, the preparation of octadienyl acetates in excess acetic acid is taught using a palladium (O) catalyst and the patentees of German Patent No. 1,807,491, disclose the use of palladium acetylacetonate as the catalyst in conjunction with phosphine ligands to make the unsaturated esters.

Finally in Canadian Pat. 829,899, there is described a process for acetic acid-butadiene co-trimerization using a palladium carboxylate catalyst together with alkali carboxylates in large amounts or phosphines or phosphites. In a later application by the same patentees, the rates and selectivities to octadienyl acetates were increased by the use of tertiary amines as a cocatalyst, usually present in up to equimolar amounts relative to the amount of acetic acid. However, because of the expense of the tertiary amines and other problems associated with their use, it is desirable that a method for co-trimerization of acetic acid and butadiene be carried out in the absence of said tertiary amines while maintaining the rate improvements. Accordingly, there is a need for an improvement in this art.

SUMMARY OF THE INVENTION

In accordance with the present invention, unsaturated esters may be prepared through the reaction of $C_4$–$C_6$ aliphatic conjugated diolefins with carboxylic acids in the presence of a palladium catalyst and a ligand modifier comprising organic phosphine or phosphite materials; the reaction is carried out in the absence of tertiary amines and the use of promoters such as sodium borohydride or acetic anhydride have unexpectedly been found to increase rates and selectivities.

The reactions may be run with excess diolefin up to mole ratios of 4:1 or higher relative to the amount of carboxylic acid employed and preferably are conducted in the liquid phase employing a homogeneous reaction system in which the carboxylic acid acts as solvent and co-reactant. Normally, the process is conducted at temperatures of less than about 150° C. and in the substantial absence of oxygen.

The catalyst system used to promote the reaction consists of soluble palladium salts with the exception of palladium chloride, together with ligand modifiers such as organic phosphine or phosphite materials and a promoter which may be either sodium borohydride or acetic anhydride.

For example, the co-trimerization of acetic acid with butadiene in the presence of palladium catalysts yield a mixture of 1,3,7-octatriene, butenyl acetate and as the principal products, according to the following equations 1- and 3-octadienyl-acetates

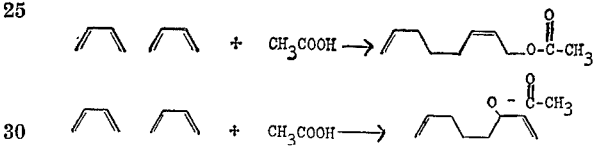

Equations 1 and 2 above demonstrate the reaction of two moles of butadiene with acetic acid to form a mixture of octadienyl acetates. The major reaction product is the 1-isomer but minor amounts of the 3-isomer are also formed together with lesser amounts of octatriene and butenyl acetates.

The starting diolefinic reagent is preferably a $C_4$–$C_6$ conjugated acyclic aliphatic hydrocarbon material; examples of useful diolefins include butadiene and isoprene.

The coreactant carboxylic acid employed may be any compound incorporating within the structure at least one carboxy group, i.e., a COOH group; said compounds hereinafter referred to as carboxylic acids. Preferably, the carboxylic acid employed is one of a relatively simple structure such as carboxylic acids of up to 8 carbon atoms and having from 1 to 3 carboxy groups. The organic carboxylic acid is suitably, wholly aliphatic in character or wholly aromatic in character or may incorporate both aliphatic and aromatic moieties.

Nonlimiting representative examples of aliphatic carboxylic acids that may be used in the present process include aliphatic carboxylic acids such as acetic acid, butyric aid, 2-ethylhexanoic acid, dodecanoic acid, glutaric acid, adipic acid, hexadecanoic acid, as well as substituted aliphatic hydrocarbon carboxylic acids such as 3-acetoxy propionic acid, and the like and may also include substituted or unsubstituted cycloparaffinic carboxylic acids such as cyclopentane carboxylic acid.

Also suitable are aromatic carboxylic acid reactants, both alicyclic and heterocyclic such as aromatic carboxylic acids including benzoic acid, terephthalic acid, phthalic acid, pyromellitic acid as well as substituted aromatic hydrocarbons carboxylic acids such as p-methylbenzoic acid and the like. Carboxylic acids having both aromatic and aliphatic characteristics may also be employed as reactants and are exemplified by moieties such as phenylacetic acid, m-toluic acid, and 5-methyl isophthalic acid.

Preferably, the carboxylic acids employed are those which are described as wholly aliphatic in character and having from 2 to 8 carbon atoms and 1 carboxy group; most preferred is acetic acid.

The ester formation reaction may be carried out in either the absence or presence of a solvent. It is preferred that the reaction be conducted in a homogeneous reaction system. Typically, the desired homogeneous system may be obtained without the use of extraneous solvents since the diolefin reactants are generally soluble in the carboxylic acid coreactants. However, in a procedure wherein a solvent is employed, solvents that are suitable are those which are capable of dissolving the reactants, the catalysts and the catalyst promoter and furthermore, are inert to the reactants and their product. Nonlimiting representative examples of useful solvent materials include dialkyl ethers such as diethyl ether, alkylaryl ethers, such as anisole and phenylbutyl ether; benzene, toluene and xylene; N,N dialkyl alkanoic acid amides; and the like.

The catalyst system used to promote the formation of the unsaturated ester product is composed of a catalyst species derived from a palladium compound and either is soluble in the reaction mixture or which can be solubilized with a solvent or one of the components of said mixture. With the exception of palladium chloride, any salt of palladium which is soluble in the reaction mixture may be employed. Nonlimiting representative examples of palladium compounds, which may be used, include palladium alkanoates, such as palladium acetate, palladium propionate and the like; palladium cycloalkane carboxylates such as palladium cyclohexane carboxylate and the like; palladium aryl carboxylates, such as palladium benzoate; palladium monomethylphthalate and the like.

Complexes of palladium with trihydrocarbyl phosphines and arsines, such as bis-triphenylphosphine palladium acetate, tetrakis (triphenylphosphine) palladium, tetrakis (dimethyl phenylphosphine) palladium and the like are also useful.

The second component of the catalyst system is the ligand modifier which may be generally described as an organic phosphine or phosphite. It is preferred, however, to utilize organic phosphites as the ligand modifiers. By organic phosphite is meant compounds having the formula $P(OR')_3$ wherein R' is a hydrocarbyl radical selected from the group consisting of alkyl radicals having from 1 to 12 carbon atoms; phenyl radicals; aralkyl radicals having from 7 to 15 carbon atoms. Preferred are bicyclic phosphite ligand modifiers illustrated by the following formula:

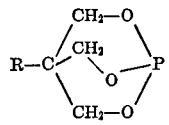

Nonlimiting representative examples of useful phosphite modifiers are 1-ethyl-3,5,8-trioxa-4-phospha-bicyclooctane; 1-methyl-3,5,8-trioxa-4-phospha-bicyclooctane; 1-propyl-3,5,8-trioxa-4-phospha-bicyclooctane; triethyl phosphite, triphenyl phosphite and the like.

The R of the formula for bicyclic phosphites above, is generally an alkyl radical having from 1 to 8 carbon atoms, more preferably from 1 to 3 and most preferably from 1 to 2 carbon atoms. Most preferred is the bicyclic phosphite, wherein the R grouping is ethyl, i.e., 1-ethyl-3,5,8-trioxa-4-phospha-(2,2,2)-bicyclooctane.

Typically the amount of reactants employed will be such that the molar ratio of diolefin to carboxylic acid within the reaction zone varies from between about 10:1 to 0.1:1, preferably 4:1 to 1:1 moles diolefin per mole of carboxylic acid. Most preferably, the diolefin will be employed in at least one molar excess relative to the amount of carboxylic acid reactant employed.

As described above, considerable improvements in rates and selectivities of the formation of 1-acetoxy-octadiene-2,7 are obtained when a promoter such as sodium borohydride is used in conjunction with the above-described catalyst system together with the bicyclic phosphite ligand modifier. The amount of sodium borohydride to be employed based on the amount of carboxylic acid is in the range of from about 0.1 to 10 mmoles of sodium borohydride per mole of butadiene, most preferably from 1 to 3 mmoles.

The aforementioned rate increases may also be effected as well as selectivities to the 1-acetoxy-octadiene ester by employing acetic anhydride as the promoter, together with the above-described catalyst system. The amount of acetic anhydride to be employed relative to the amount of butadiene will range from about 0.001 mole/mole of butadiene to 10, more preferably from 0.01 to 1 and most preferably from 0.01 to 0.5 mole/mole of butadiene employed.

The reaction conditions for the formation of the ester products will vary widely. Typically the reaction will be conducted in the liquid phase and at temperatures of from 30 to 150° C., more preferably from 60 to 130° C. The reaction pressure, which is the pressure within the reaction zone, is typically autogenous pressure exerted by the reactants and solvent, at reaction temperatures. The length of the reaction will depend upon a number of process variables and can readily be monitored by various analytical techniques, such as gas chromatography and the like. High product yields are typically secured at the above-described temperature and pressure conditions within about 0.5 to 10 hours. Substantial product yields may be secured within 1 hour.

The unsaturated ester compounds of the invention have many uses. The compositions may be hydrogenated in the presence of typical hydrogenation catalysts and hydrolyzed to yield the corresponding saturated linear alcohol, i.e., n-octanol which is well known in the art as an ingredient useful in the preparation of plasticizers and the like.

DESCRIPTION OF THE PREFERRED EMBODIMENT

The invention will be further understood but is not necessarily limited to the following examples:

EXAMPLE 1

Under nitrogen atmosphere, 0.0099 g. (0.0326 mmol) palladium acetylacetonate, i.e., $Pd(AcAc)_2$ was placed together with 0.011 (0.0685 mmol) 1-ethyl-3,5,8-trioxa-4-phospha (2,2,2) bicyclooctane and 0.1137 g. (3 mmol) sodium borohydride into a 300 cc. stainless steel autoclave. 15 g. (0.25 mol) glacial acetic acid was added to this mixture; 54 g. (1 mol) 1,3-butadiene was then distilled into the reactor.

The reactor was brought up to about 30 to 35° C. with warm water, then it was placed into a heating mantle. Heating and magnetic stirring were started. The reaction time was considered to have started with switching on the heat.

Within 14 minutes the reaction temperature, which was monitored by an iron-constantine thermocouple, rose to 120° C. Occasionally when the reaction was particularly quick, reaction heat would create a temporary heat overshoot up to 130° C. The pressure rose to about 300 p.s.i. After about 15 minutes reaction time the pressure started to drop indicating that the reaction was well underway. After 60 minutes of reaction time, the reactor was cooled to room temperature and the unreacted butadiene was vented.

The crude reaction mixture which weighed 44.7 g. was analyzed by gas chromatography with nonane as internal standard. It was shown to contain 65.9% 1-acetoxy octadiene-2,7; 16.8% 3-acetoxyoctadiene-1,7; and 1% of 1,3,7-octatriene and 4-vinyl-cyclohexane combined. The amount of butenyl acetate was less than 1%. By excluding unreacted acetic acid and butadiene the product composition was calculated by normalizing to 100%. The total yield in 1- and 3-octadienyl acetates based on acetic acid was found to be 88%.

EXAMPLES 2-15

All other examples were obtained in a similar fashion as Example 1 only by changing the ligands, the quantities of substrates and the cocatalysts or additives as indicated in the tables. The conditions and the results of these examples are found summarized in the following tables.

Table I illustrates that $NaBH_4$ is specific in promoting the reaction since other bases or hydrides do not provide the same kind of rate increases.

0.0675 mm. 1-ethyl-3,5,8 - trioxa - 4 - phospha (2,2,2) bicyclooctane, 120° C., 30 minutes 0.5 mole $CH_3COOH$, 1 mole butadiene The results of these two runs are summarized below in Table V and illustrate that in the absence of the $NaBH_4$ promoter at stoichiometric conditions appreciable rates are obtainable and also that in the presence of $NaBH_4$ at stoichiometric conditions an almost two-fold rate increase is obtained.

TABLE I.—ACETIC ACID/BUTADIENE CO-TRIMERIZATION, SODIUM BOROHYDRIDE CO-CATALYSTS AND THE INEFFECTIVENESS OF OTHER ADDITIVES

| | | Rates (g./g. Pd/h) | | | Total $C_8$ acetate yield, percent | Product composition (wt. percent) | | | |
|---|---|---|---|---|---|---|---|---|---|
| Example | Mmol additive | 1-acetate | 3-acetate | Total acetate | | 1-acetate | 3-acetate | $C_4$ Acetate | 1,3,7-OCT plus VCH |
| 2 | None | 3,280 | 274 | 3,554 | 14.7 | 68.7 | 5.75 | 10.4 | 15.2 |
| 3 | 3$NaBH_4$ | 16,634 | 4,238 | 21,872 | 88.1 | 78.8 | 20.1 | | 1.1 |
| 4 | 3$CaH_2$ | 4,373 | 430 | 4,803 | 19.6 | 74.5 | 7.3 | 6.9 | 11.2 |
| 5 | 3$CH_3COONa$ | 3,292 | 383 | 3,675 | 14.1 | 71.2 | 8.6 | 7.7 | 12.5 |
| 6 | 3$LiAlH_4$ | 2,914 | 664 | 3,578 | 15.1 | 51.4 | 11.7 | 14.6 | 22.4 |

Conditions.—0.03375 mmol $Pd(AcAc)_2$, 0.0675 1-ethyl-3,5,8-trioxa-4-phospha-(2,2,2)-bicyclooctane, 0.25 mol $CH_3COOH$, 1.0 mol butadiene, 120° C., 30 min. yields calculated on $CH_3COOH$.

Note.—$C_8$ acetate=octadienyl acetate (1-acetate plus 3-acetate); 1-acetate=1-acetoxyoctadiene-2,7; 3-acetate=3-acetoxyoctadiene-1,7; $C_4$ acetate=butenyl acetate; 1,3,7-OCT=Octatriene-1,3,7; VCH=4-vinylcyclohexene.

Table II illustrates the effects that butadiene:acetic acid mole ratio has on rates and selectivities.

Table III shows the particular advantage of utilizing a bicyclicphosphite material as a ligand modifier. Note that the rate obtained with 1-ethyl-3,5,8-trioxa-4-phospha (2,2,2) bicyclooctane is nearly eight times higher than the rate obtained with triphenylphosphite.

Table IV illustrates the rate improvements obtained by utilizing acetic anhydride as a promoter and also that rate improvements with said promoter are possible even when excess acetic acid is employed.

EXAMPLE 16

In a manner identical to Example 1, two runs 16A and 16B were made using the following conditions:

0.03375 mmole $Pd(AcAc)_2$

TABLE II.—ACETIC ACID/BUTADIENE CO-TRIMERIZATION, EFFECT OF BUTADIENE/$CH_3COOH$ RATIO ON REACTION RATE

| | | Rates—g./g. Pd/h. | | | Total acetate yield, percent |
|---|---|---|---|---|---|
| Example | Mol ratio $C_4$/$CH_3COOH$ | 1-acetate | 3-acetate | Total $C_8$ acetate | |
| 7 | 2:1 | 2,718 | 954 | 3,672 | 21 |
| 8 | 3:1 | 8,840 | 2,842 | 11,682 | 68 |
| 9 | 4:1 | 12,730 | 4,260 | 16,990 | 97 |

Conditions.—0.0675 mmol $Pd(AcAc)_2$, 0.125 mmol 1-ethyl-3,5,8-trioxa-4-phospha-(2,2,2)-bicyclooctane, 0.25 mol $CH_3COOH$, 1 mmol $NaBH_4$, 120° C., 21-30 minutes. Yields calculated on $CH_3COOH$.

Note.—1-acetate=1-acetoxyoctadiene-2,7; 3-acetate=3-acetoxyoctadiene-1,7; $C_8$ acetate=octadienyl acetate (1-acetate plus 3-acetate).

TABLE III.—ACETIC ACID/BUTADIENE CO-TRIMERIZATION, LIGAND EFFECT IN PRESENCE OF SODIUM BOROHYDRIDE

| | | Rates (g./g. Pd/h.) | | | Total $C_8$ acetate yield | Product composition | | | |
|---|---|---|---|---|---|---|---|---|---|
| | Ligand | 1-acetate | 3-acetate | Acetate (total) | | 1-acetate | 3-acetate | $C_4$ acetate | 1,3,7 OCT |
| Example: | | | | | | | | | |
| 10 | TPPO | 2,290 | 155 | 2,445 | 10.1 | 79.0 | 5.4 | 3.4 | 12.2 |
| 11 | BCP | 16,231 | 4,295 | 20,526 | 86.6 | 77.3 | 20.5 | <1 | 2.23 |

Note.—1-acetate=1-acetoxyoctadiene-2,7; 3-acetate=1-acetoxyoctadiene-1,7; $C_8$ acetate=octadienyl acetate (1-acetate plus 3-acetate); 1,3,7- OCT=octatriene-1,3,7; TPPO= Triphenyl phosphite; BCP=1-ethyl-3,5,8-trioxa-4 phospha-(2,2,2)-bicyclooctane.
Conditions.—0.03375 mmol $Pd(AcAc)_2$, 0.0675 mmol phosphine or phosphite, 3 mmol $NaBH_4$, 1 mol butadiene, 0.25 mol $CH_3COOH$, 120° C., 30 minutes.

TABLE IV.—ACETIC ACID/BUTADIENE CO-TRIMERIZATION, ACETIC ANHYDRIDE ENHANCED

| | | Rates (g./g. Pd/h.) | | | Total $C_8$ acetate yield | Product composition | | | |
|---|---|---|---|---|---|---|---|---|---|
| Example | Mmol additive | 1-acetate | 3-acetate | $C_8$ acetate (total) | | 1-acetate | 3-acetate | C acetate | 1,3,7 OCT |
| 2 | None | 3,280 | 274 | 3,554 | 14.7 | 68.7 | 5.8 | 10.4 | 15.2 |
| 12 | 3$NaBH_4$ | 16,634 | 4,238 | 21,872 | 88.1 | 78.8 | 20.1 | | 1.1 |
| 13[1] | $(CH_3CO)_2O$, 125 | 20,331 | 2,972 | 23,303 | 43.8 | 85.2 | 12.5 | | 2.3 |
| 14[1] | 3$NaBH_4$, $(CH_3CO)_2O$, 125 | 21,905 | 3,218 | 25,123 | 43.0 | 84.1 | 12.4 | | 3.4 |
| 15[2] | $(CH_3CO)_2$ 250 | 6,064 | 1,205 | 7,284 | 67.7 | 78.7 | 15.9 | | 5.4 |

[1] Only 44.5% of usual amount of catalyst employed.
[2] 0.75 mol $CH_3COOH$ instead of 0.25 mol.
Conditions.—0.03375 Mmol $Pd(AcAc)_2$, 0.0675 mmol 1-ethyl-3,5,8-trioxa-4-phospha (2,2,2)-bicyclooctane, 0.25 mol $CH_3COOH$, 1 mol butadiene, 120° C., 30 mi. yields calculated on $CH_3COOH$, except for Example 15 where it is based on butadiene.

Note.—1-acteate=1-acetoxyoctadiene-2,7; 3-acetate=3-acetoxyoctadiene-1,7; $C_8$ acetate=octadienylacetate (1-acetate+3-acetate); $C_4$ acetate=butenyl acetate; 1,3,7 OCT=Octatriene-1,3,7.

TABLE V.—SODIUM BORHYDRIDE CO-CATALYSTS

| Runs | Additive | 1-acetate | 3-acetate | Total acetate | Total acetate yield | Product composition | | | |
| --- | --- | --- | --- | --- | --- | --- | --- | --- | --- |
| | | | | | | 1-acetate | 3-acetate | Butenyl acetate | 1,3,7-octatriene |
| 16A | None | 4,938 | 862 | 5,800 | 12.9 | 70.7 | 12.4 | 6.4 | 10.5 |
| 16B | 3mmoles NaBH₄ | 9,720 | 2,112 | 11,832 | 25.7 | 72 | 18.4 | 3.0 | 6.4 |

Conditions.—0.03375 mmole pd(AcAc)₂, 0.0675 mmol 1-ethyl-3,5,8-trioxa-4-phospha-(2,2,2)-bicyclooctane, 120° C., 30 minutes, Yields calculated on CH₃COOH, 0.5 mole CH₃COOH, 1 mol C₄'''.

NOTE.—1-acetate=1-acetoxyoctadiene-2,7; 3-acetate=3-acetoxyoctadiene-1,7; C₄'''=butadiene.

What is claimed is:

1. A process for the formation of unsaturated esters which comprises contacting in the liquid phase, a C₄–C₆ conjugated diolefin with a carboxylic acid in the presence of a palladium catalyst, said palladium catalyst selected from the group consisting of palladium alkanoates, palladium cycloalkane carboxylates, palladium aryl carboxylates and palladium complexes of trihydrocarbyl phosphines and arsines, an organic phosphite modifier having the formula P(OR')₃ wherein R' is a hydrocarbyl radical selected from the group consisting of alkyl radicals having from 1 to 12 carbon atoms; phenyl radicals, aralkyl radicals having from 7 to 15 carbon atoms, or a bicyclic phosphite ligand having the formula:

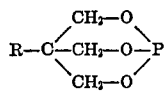

wherein R is an alkyl radical having from 1 to 8 carbon atoms and sodium borohydride as a promoter, said contacting being carried out in the substantial absence of oxygen and thereafter recovering a yield of said esters.

2. The process of claim 1 wherein said carboxylic acid is acetic acid.

3. The process of claim 2 wherein said C₄–C₆ conjugated diolefin is butadiene and is present in molar ratios relative to said acetic acid of from 4:1 to 1:1.

4. The process of claim 2 wherein the contacting is carried out at temperatures in the range of from about 30 to about 150° C.

5. The process of claim 1 wherein the palladium catalyst is palladium acetylacetonate.

6. The process of claim 1 wherein said organic phosphite modifier has the formula:

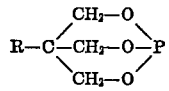

wherein R is an alkyl radical having from 1 to 3 carbon atoms.

7. A process for the formation of unsaturated esters which comprises contacting in the liquid phase, a C₄–C₆ conjugated diolefin with a carboxylic acid in the presence of a palladium catalyst, said palladium catalyst selected from the group consisting of palladium alkanoates, palladium cycloalkane carboxylates, palladium aryl carboxylates and palladium complexes of trihydrocarbyl phosphines and arsines, an organic phosphite modifier having the formula P(OR')₃ wherein R' is a hydrocarbyl radical selected from the group consisting of alkyl radicals having from 1 to 12 carbon atoms; phenyl radicals; aralkyl radicals having from 7 to 15 carbon atoms, or a bicyclic phosphite ligand having the formula:

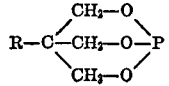

wherein R is an alkyl radical having from 1 to 8 carbon atoms and acetic anhydride as a promoter, said contacting being carried out in the substantial absence of oxygen to thereafter recover a yield of said esters.

8. The method of claim 7 wherein the C₄–C₆ conjugated diolefin is butadiene.

9. The method of claim 7 wherein said palladium catalyst is palladium acetate or palladium acetylacetonate.

10. The process of claim 7 wherein said bicyclo phosphite has the formula:

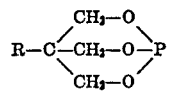

wherein R is an alkyl radical having from 1 to 3 carbon atoms.

11. The process of claim 11 wherein said carboxylic acid is acetic acid.

12. The process of claim 11 wherein butadiene is present in excess amounts relative to said acetic acid.

13. The process of claim 11 wherein acetic acid is present in excess amounts relative to said butadiene.

14. The process of claim 7 wherein the contacting is carried out at temperatures in the range of from about 30 to 150° C.

15. A process for the formation of unsaturated esters comprising contacting in the liquid phase, butadiene with acetic acid, in the presence of a soluble palladium catalyst, said palladium catalyst being selected from the group consisting of palladium alkanoates, palladium cycloalkane carboxylates, palladium aryl carboxylates and palladium complexes of trihydrocarbyl phosphines and arsines, a ligand modified comprising 1-alkyl-3,5,8-trioxo-4-phospha-2,2,2-bicyclooctane and acetic anhydride as a promoter, said contacting being carried out in the substantial absence of oxygen and thereafter recovering a yield of said ester.

16. The process of claim 15 wherein acetic acid is present in a molar excess relative to the amount of butadiene present in the reaction zone.

17. The process of claim 15 wherein said contacting is carried out at temperatures in the range of from 30 to 150° C.

References Cited

UNITED STATES PATENTS 3,711,534   1/1973   Manyik et al. _____ 260—497 A

FOREIGN PATENTS 1,178,812   1/1970   Great Britain _____ 260—497 A
829,899   12/1969   Canada _____ 260—497 A LORRAINE A. WEINBERGER, Primary Examiner R. D. KELLY, Assistant Examiner U.S. Cl. X.R.

260—410.9 N, 468 R, 475 N, 476 R, 484 A, 485 N